United States Patent [19]

Gerkey et al.

[11] 4,287,655

[45] Sep. 8, 1981

[54] END EFFECTOR POSITION AND IDENTIFICATION SYSTEM FOR STEAM GENERATOR SERVICING MACHINE

[75] Inventors: Kenneth S. Gerkey, Mt. Lebanon; Raymond P. Castner, Monroeville, both of Pa.

[73] Assignee: Westinghouse Electric Corp., Pittsburgh, Pa.

[21] Appl. No.: 34,312

[22] Filed: Apr. 30, 1979

[51] Int. Cl.³ .................... B23P 15/26; B23Q 21/00
[52] U.S. Cl. .................. 29/407; 29/157.4; 29/723; 29/727; 165/76
[58] Field of Search ............... 29/157.3 R, 157.3 C, 29/157.4, 407, 723, 726, 727; 165/76; 408/1, 13; 414/744 R

[56] References Cited

U.S. PATENT DOCUMENTS

| | | | |
|---|---|---|---|
| 3,889,820 | 6/1975 | Ranger | 165/76 X |
| 3,913,752 | 10/1975 | Ward et al. | 165/76 X |
| 4,004,698 | 1/1977 | Gebelin | 165/76 X |
| 4,018,344 | 4/1977 | Leshem | 165/76 X |
| 4,018,345 | 4/1977 | Formanek et al. | 165/76 X |
| 4,018,346 | 4/1977 | Leshem et al. | 165/76 X |
| 4,074,814 | 2/1978 | Cooper et al. | 165/76 X |
| 4,148,403 | 4/1979 | Riffe | 165/76 X |
| 4,158,415 | 6/1979 | Young | 165/76 X |
| 4,168,782 | 9/1979 | Sturges | 165/76 X |
| 4,178,787 | 12/1979 | Gerkey | 29/727 X |

*Primary Examiner*—Ervin M. Combs
*Attorney, Agent, or Firm*—Daniel C. Abeles

[57] ABSTRACT

The identity of a cantilevered end effector support member and its angular position on the platform member of a carriage movable along an arm which is rotatable in a plane parallel to a steam generator tubesheet, are supplied to a tubesheet servicing machine control system in the form of a discrete pattern of electrical signals which is used to determine the offset required in aligning the end effector with a particular point on the tubesheet. The discrete pattern of electrical signals is generated by at least two sensor elements mounted on one of the members, preferably at different radial distances from the pivot axis of the support member. At least two trigger elements are mounted on the other member in such a pattern as to trigger selected sensor elements to produce the discrete pattern of signals.

8 Claims, 7 Drawing Figures

END EFFECTOR POSITION AND IDENTIFICATION SYSTEM FOR STEAM GENERATOR SERVICING MACHINE

BACKGROUND OF THE INVENTION

1. Field of the Invention

This invention relates to apparatus and a method of operating the same for servicing a steam generator and, more particularly, to determinining the identity and angular position of an end effector cantilevered from a servicing machine and to operating the machine to align the end effector with a selected portion of the steam generator tubesheet, taking into account the offset of the end effector.

2. Description of the Prior Art

Commonly owned U.S. Pat. No. 4,205,940 discloses a machine for servicing the tubesheet of a steam generator in a pressurized water reactor nuclear powered electric generating system, and U.S. patent application Ser. No. 952,431 filed Oct. 18, 1978 discloses a method of operating the machine. That servicing machine includes an arm pivoted to move in a plane parallel to and underneath the semicircular hole array in one-half of a steam generator tubesheet. A carriage mounted for reciprocal movement along the arm is provided with a platform which can be raised toward the tubesheet. In order to carry out selected operations on the tubesheet, various end effectors may be mounted on the platform. Due to the constraints imposed by the shape of the channel head below the tubesheet and the proximity of some of the holes in the array to the walls of the channel head, it is necessary that the end effectors be mounted on cantilevered arms and that the cantilevered arms be mounted at different angles on the platform in order to reach all of the holes in the array with the different end effectors. In some instances, cantilevered arms of more than one length are required for one type of end effectors in order that the desired operations can be performed at each of the holes in the array.

In order to change the end effectors or to adjust the angular position of the cantilevered arms on the platform of the servicing machine, the machine arm is pivoted out of the plane parallel to the tubesheet and is angularly aligned with a manway in the channel head where a technician can manually make the required changes. Since this process is time consuming and exposes the technician to radioactivity present in the channel head, an automatic slewing table was developed for use with some of the end effectors. This device, which permits the changes in angular position of the cantilevered arm to be made remotely, is described in U.S. patent application Ser. No. 896,530 filed Apr. 14, 1978 U.S. Pat. No. 4,200,424 and a method for operating it is disclosed in U.S. patent application Ser. No. 974,159 filed Dec. 28, 1978.

In performing the various operations on the tubesheet, the offset of the end effector produced by the length of the cantilevered arm and its angular position on the platform must be taken into account. When the angular position of the arm is set manually by a technician, both this angle and the radial distant of the end effector from the pivot point on the platform must be manually supplied to the servicing machine control system. When the automatic slewing table is used, the angular position of the cantilevered end effector support is automatically supplied to the control system as an analog signal by a feedback sensor; however, it is still necessary to manually identify to the control system the radial offset of the end effector as mounted on the particular cantilevered arm. It is essential that the precise offset, both radially and angularly, of the end effector be supplied to the servicing machine control system to preclude damage to the machine or steam generator such as by interference between portions of the machine and the steam generator or by performing an operation, like drilling a hole, at the wrong location. It is also essential that the correct end effector be mounted on the platform for the operation to be performed by the machine.

It is a primary object of this invention to provide apparatus and a method for accurately identifying to a steam generator servicing machine the end effector carried by an arm cantilevered from the machine and the angular position of the cantilevered arm on the machine.

It is also an object of the invention to utilize this information to control the operation of the servicing machine.

SUMMARY OF THE INVENTION

The present invention precludes the possibility of misidentifying the particular end effector and the angle that it is cantilevered from the carriage of a servicing machine for a steam generator tubesheet by providing for the generation of a discrete pattern of electrical signals for each angular position of each end effector support arm. With such an arrangement, use of the proper end effector for the operation to be performed by the machine is assured. In addition, it is assured that the proper angular and radial offset of the end effector mounted on the end of the cantilevered arm is taken into account by the servicing machine control system so that the components in the various axes of the servicing machine can be properly operated to position the end effector at the correct spot in the tubesheet and to avoid interference or collision of the servicing machine with components of the steam generator.

The invention is carried out by providing at least two sensor elements, each of which generates an electrical signal when triggered, and at least two trigger elements, each of which triggers a sensor element when aligned therewith. The elements are arranged with one type on the carriage platform member of the servicing machine and the other type on the cantilevered end effector support arm member. They are arranged on the respecitive members to generate a discrete pattern of electrical signals for each of a plurality of angular positions of the cantilevered support member through the alignment of trigger elements with selected ones of the sensor elements. Means responsive to this discrete pattern of electrical signals then position the arm and carriage of the servicing machine to align the end effector mounted on the free end of the cantilevered support member with a selected location on the tubesheet. The pattern of electrical signals can also be used to identify the particular end effector support member mounted on the platform either as an alternative to, or in conjunction with, the determination of the angular position of the support member.

Preferably, the sensor and trigger elements are embedded in confronting parallel surfaces on the platform member and the cantilevered end effector support member. It is also preferable that each of the sensor elements be arranged at a different radial distance from the pivot axis of the cantilevered end effector support member and that at least one of the trigger elements be located at the same radial distance from the pivot axis as each of the sensor elements.

The discrete pattern of electrical signals is used to determine the offset of the end effector which in turn is used to position the arm and carriage on the servicing machine to align the end effector with a selected location on the tubesheet. Prior to positioning the arm and carriage, the angular position of cantilevered end effector support member, as represented by the discrete pattern of signals, can be compared with an angular position preselected for servicing the selected tubesheet location. If these angles are not the same, the angle of the cantilevered support member can be appropriately adjusted.

DESCRIPTION OF THE PREFERRED EMBODIMENT

Figure 1:
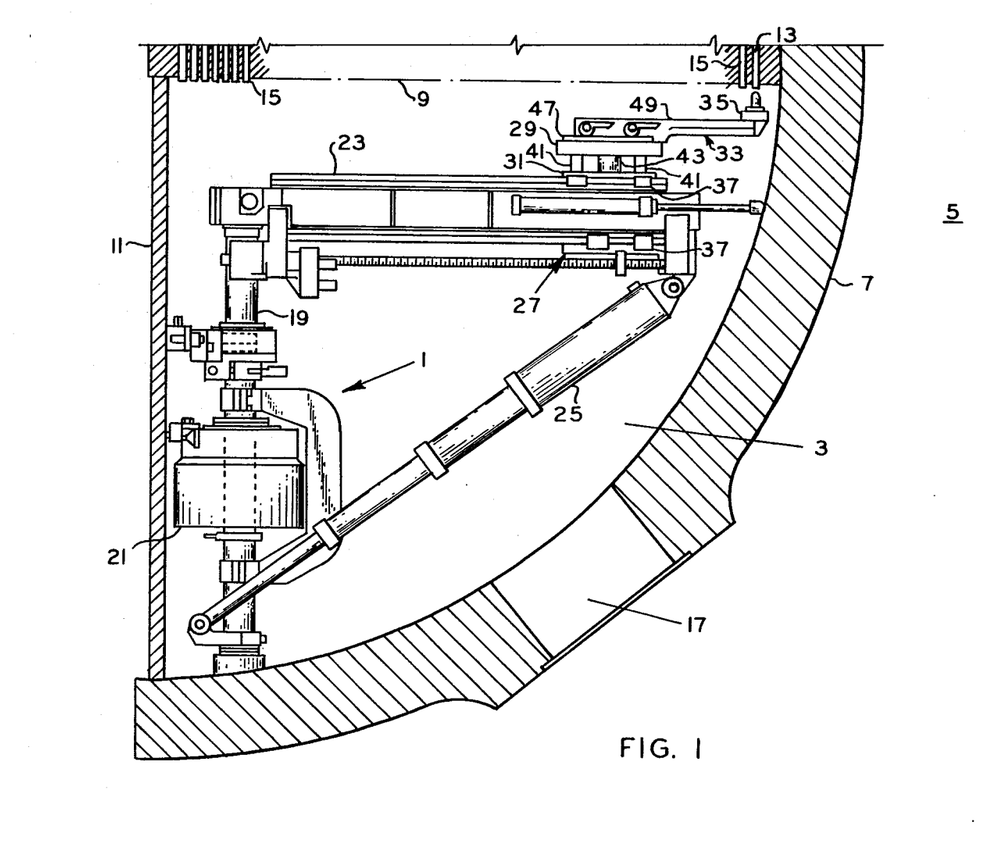
FIG. 1 is a partial vertical sectional view through a nuclear steam generator illustrating servicing apparatus incorporating this invention in place in the channel head.

The invention will be described as applied to the steam generator servicing apparatus 1 shown in FIG. 1. Detailed explanations of this apparatus and its operation are set forth in commonly owned U.S. Pat. No. 4,200,424 and in application Ser. No. 952,432 filed on Oct. 18, 1978. However, for the purpose of gaining an understanding of the present invention, FIG. 1 illustrates one-half of the channel head 3 formed on the lower end of a nuclear steam generator 5 by the hemispherical shell 7 and the tubesheet 9. The channel head 3 is divided into an inlet side and an outlet side (only one shown) by a vertical divider plate 11. The opposite ends of thousands of U-shaped tubes 13 communicate with the inlet and outlet sections of the channel head through holes 15 in the tubesheet. The channel head 3 and U-shaped tubes 13 form the primary side of the heat exchanger with primary coolant from the nuclear reactor entering the inlet side of the channel head 3 through an inlet (not shown), circulating through the U-shaped tubes and exiting the outlet side through an outlet (not shown). Water circulating around the U-shaped tubes in the secondary side of the heat exchanger above the tubesheet 9 is converted into steam by heat given up by the primary coolant.

Periodically it is necessary to service the tubing in the steam generator and for this purpose an apparatus 1 is inserted into each side of the channel head 3 through a manway 17. The servicing apparatus comprises a column 19 which is rotatable about a vertical axis by a motor 21. An arm 23 is pivotally connected at one end to the top of the vertical column 19 and is supported at the other end by a pair (only one shown) of hydraulic cylinders 25 connected between the arm and the lower end of the column 19. In the operative position as illustrated in FIG. 1, the arm 23 is supported in a horizontal position and is rotated in a plane just below and parallel to the tubesheet as the column 19 is rotated by the motor 21.

Figure 2:
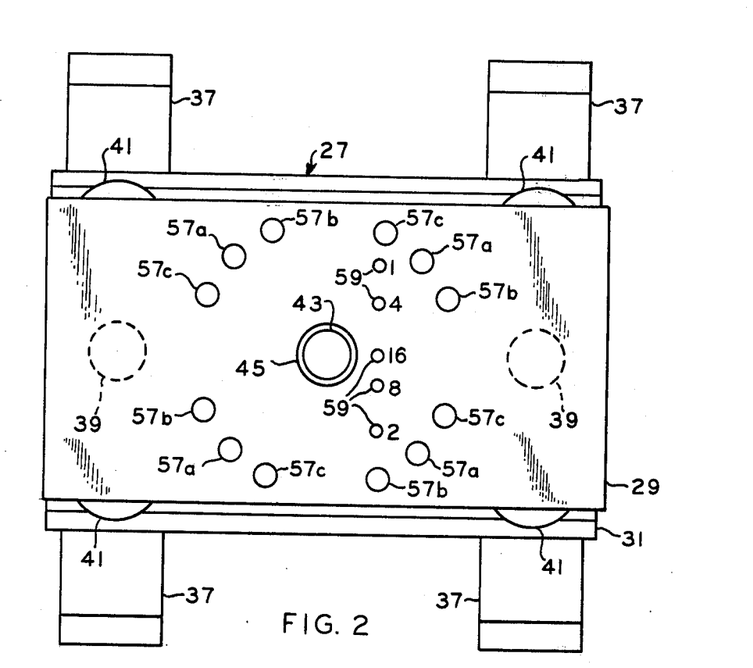
FIG. 2 is a plan view of the carriage of the servicing apparatus of FIG. 1 with the cantilevered tool support arm removed therefrom and illustrating a pattern of sensor elements embedded in the upper surface of the carriage elevator platform.

A carriage 27, mounted by bearings 37 for longitudinal movement along the arm 23, is provided with a platform 29 vertically extendable as shown in FIG. 1 above a base plate 31. As shown in FIGS. 1 and 2, the platform 29 is raised and lowered relative to the base plate 31 by a pair of hydraulic cylinders 39 and is precisely guided in its vertical travel by four columns 41 supported at each corner of the carriage 27 by additional bearings (not shown). A drive shaft 43 which extends upward through bore 45 at the center of the elevator platform 29 transmits rotational power from a motor (not shown) mounted under the platform to an end effector mounted on the platform.

By appropriate coordination of the rotation of the arm 23 and the movement of the carriage 27 along the arm, an end effector 35 carried by the carriage can be positioned under a selected hole in the tubesheet 9 and raised into operative position by the platform 29, all as fully explained in the above mentioned copending applications. However, as is evident from FIG. 1, and as will become more evident from the description below of FIG. 5, an end effector mounted directly on the platform 29 cannot reach all of the holes 15 in the tubesheet 9 due to the limits of travel of the carriage 27 and the configuration of the hole array. In order to reach the portions of the tubesheet beyond the limits of travel of the carriage 27, a cantilevered end effector support arm 33 is mechanically clamped onto the carriage. By mounting the end effector support arm 33 so that it extends radially outward from the vertical column 19 as shown in FIG. 1, holes 15 near the circular portion of the periphery of the hole array can be reached by the end effector 35. However, for reaching the holes adjacent the divider plate 11 which are behind the vertical axis about which the arm 23 is pivoted, the end effector support arm 33 must be turned around so that it can be directed radially inward. As is explained below, it is also necessary to position the end effector support arm 33 at several intermediate angular positions and, in some instances, to substitute an end effector support arm of a different length in order to reach all the holes in the array. In order to make these changes the arm 23 is rotated in a horizontal plane by motor 21 and then in a vertical plane by hydraulic cylinders 25 to align the end of the arm with the manway 17 where the adjustments can be made manually by a technician.

Figure 3:
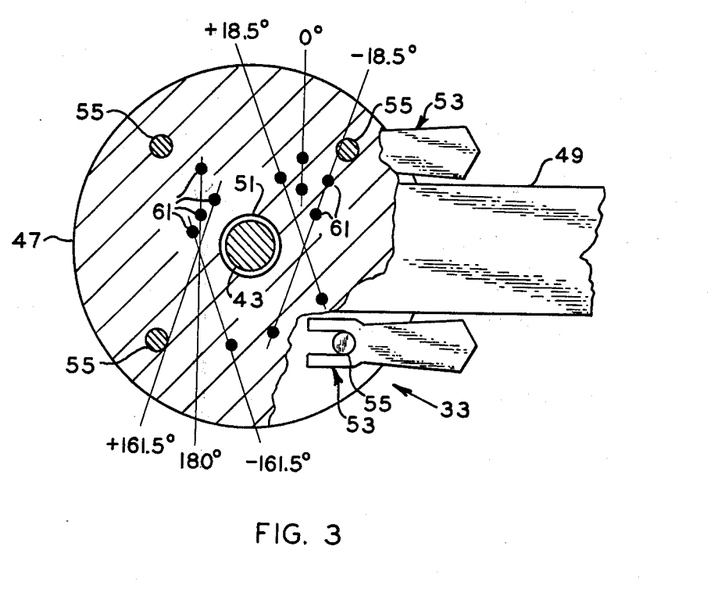
FIG. 3 is a plan view partially in section of the cantilevered tool support arm illustrating a pattern of trigger elements embedded in the lower surface thereof.

As can be seen from FIGS. 1 and 3, the end effector support arm 33 includes a circular mounting plate 47 and an elongated section 49 cantilevered from the mounting plate. When mounted on the elevator platform 29, the drive shaft 43 from the elevator platform mounted motor extends upward through a central bore 51 in the mounting plate 47 to mesh with a gear train (not shown) in the elongated section 49 to transmit rotational power to the end effector 35 mounted on the free end of the elongated section.

The cantilevered end effector support arm 33 is secured on the elevator platform 29 of the carriage by releasable fasteners such as the 4 EXPANDO-GRIP (trademark) fasteners 53 equiangularly spaced about the central bore 51 in the mounting plate 47. When the end effector support arm 33 is placed on the elevator platform 29 with the drive shaft 43 extending through the central bore 51 in the mounting plate 47, the pins 55 of fasteners 53 extend into and grip the walls of bores 57 in the elevator platform to rigidly mount the end effector support arm on the carriage 27. With the fastener pins 55 inserted into the bores 57a on the elevator platform 29 and with the elongated section 49 of the end effector support arm 33 directed radially outward from the pivot axis 19 of the servicing machine as shown in FIG. 1, the elongated section 49 makes an angle of 0° with the longitudinal axis of the arm 23. By rotating the end effector support arm 33 before placing it on platform 29 such that the elongated section 49 is directed radially inward toward the pivot axis 19, the pins 55 still mate with the bores 57a but the end effector support arm is mounted in what is defined at the 180° position. Since the bores 57a are equiangularly spaced about the bore 45, it is evident that the end effector support arm can also be mounted in bores 57a with the elongated section extend±90° from the 0° position.

By providing additional bores 57b in the elevator platform 29 which are displaced clockwise 18.5° from the bores 57a, the end effector support arm 33 can be mounted on the carriage with the elongated section 49 extending outward or inward at an angle of +18.5° or −161.5° respectively from the outwardly directed longitudinal axis of the arm 23. Similarly, the end effector support arm 33 can be mounted at angles of −18.5° and +161.5° by providing four more bores 57c in the elevator platform which are displaced 18.5° counterclockwise from the bores 57a. It is evident that additional bores 57 can be provided in the platform 29, as required, to establish other angular positions for the cantilevered end effector support arm 33.

In order to provide to the servicing machine control system the identity of the end effector and its angular position relative to the carriage 27, a plurality of sensor elements 59 and trigger elements 61 are mounted in the confronting surfaces of the elevator platform 29 and the end effector support arm mounting plate 47. These sensor-trigger element combinations generate discrete binary signals which provide the appropriate information to the control system. Various types of sensor-trigger element combinations could be used, such as those employing microswitches or photo responsive switches; however, in the exemplary embodiment of the invention, electromagnetic proximity switches have been used.

Figure 4:
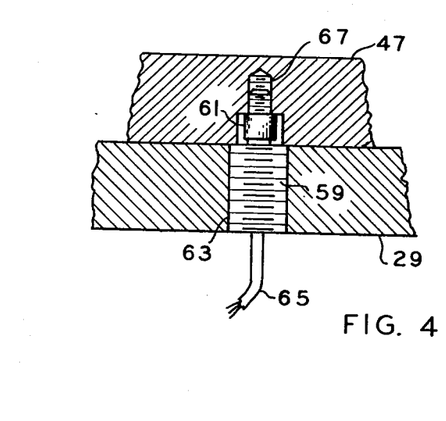
FIG. 4 is a vertical section through a portion of a carriage elevator platform and cantilevered tool support arm illustrating the cooperation of the sensor elements and trigger elements.

As shown in FIG. 4, the proximity switch sensor elements 59, such as Type 50 FY12-1 manufactured by Micro-Switch Company, are screwed into threaded bores 63 in the elevator platform 29. The sensitive portion of the switch is flush with the upper surface of the platform 29 and the electrical lead 65 extends below the platform. The trigger elements 61, which are small permanent magnets such as Type 52 FY11 manufactured by Micro-Switch, are screwed into threaded, counterbored holes 67 in the underside of the mounting plate 47 of the end effector support arm 33. The proximity switches are operated in a switching mode such that two distinct levels of signals are generated, one when the switch and magnet are aligned as shown in FIG. 4, and the other when they are not so aligned. It is possible, of course, to reverse the locations of the proximity switches and magnets; however, since there is only one elevator platform 29 but there can be many end effector support arms, it is more practical to install the active elements, the sensors, in the platform member, and the passive elements, the permanent magnets, in the end effector support arm member.

The sensor elements 59 can be arranged in any convenient pattern on the elevator platform 29, however, in order to avoid possible false indications with an end effector that is to be mounted at more than one angular position on the platform, each sensor element should be located at a different radial distance from the pivot axis of the end effector, i.e. the center of the bore 45. As shown in FIG. 2, five sensor elements representing the 1, 2, 4, 8 and 16 digits of the binary system as labeled. are arranged in a straight line and at decreasing radial distances from the center of bore 45. Alternate sensors in the sequence are located on opposite ends of the straight line in the example as a practical matter to provide separation for mounting in the platform 29. Other configurations of the sensors could be used, of course, and the number of sensors used is dependent upon the number of signal patterns that must be generated to provide a discrete signal pattern for each end effector support arm and each angular position thereof.

The trigger elements 61 are mounted in the mounting plate 47 in a pattern such that selected ones thereof are aligned with corresponding sensor elements when the end effector support arm is mounted at each of its possible angular positions on the platform. Each of the trigger elements 61 located at a particular radial distance from the end effector support arm pivot axis, which passes through the center of bore 51, triggers the same sensor 59 but, of course, only when the individual trigger element is angularly aligned with the sensor. By appropriate placement of the trigger elements 61 on the mounting plate 47, a discrete pattern of signals can be generated for each end effector support arm and each angular position thereof. Table I below illustrates a suitable code for identifying various angular positions of several different end effector support arms.

TABLE 1

| Support Arm Code No. | Support Arm Length | Support Arm Mounting Angle | Binary Code | | | | |
|---|---|---|---|---|---|---|---|
| | | | 16 | 8 | 4 | 2 | 1 |
| 1 | 7.5" | 0° | 0 | 0 | 0 | 0 | 1 |
| 2 | 7.5" | +90° | 0 | 0 | 0 | 1 | 0 |
| 3 | 7.5" | −90° | 0 | 0 | 0 | 1 | 1 |
| 4 | 7.5" | +180° | 0 | 0 | 1 | 0 | 0 |
| 5 | 15.5" | 0° | 0 | 0 | 1 | 0 | 1 |
| 6 | 15.5" | −18.5° | 0 | 0 | 1 | 1 | 0 |
| 7 | 15.5" | −18.5° | 0 | 0 | 1 | 1 | 1 |
| 8 | 15.5" | +161.5° | 0 | 1 | 0 | 0 | 0 |
| 9 | 15.5" | −161.5° | 0 | 1 | 0 | 0 | 1 |
| 10 | 15.5" | +180° | 0 | 1 | 0 | 1 | 0 |
| 11 | 19.5" | 0° | 0 | 1 | 0 | 1 | 1 |
| 12 | 19.5" | +18.5° | 0 | 1 | 1 | 0 | 0 |
| 13 | 19.5" | −18.5° | 0 | 1 | 1 | 0 | 1 |
| 14 | 19.5" | +161.5° | 0 | 1 | 1 | 1 | 0 |
| 15 | 19.5" | −161.5° | 0 | 1 | 1 | 1 | 1 |
| 16 | 19.5" | +180° | 1 | 0 | 0 | 0 | 0 |
| 17 | 21" | 0° | 1 | 0 | 0 | 0 | 1 |

TABLE 1-continued

| Support Arm Code No. | Support Arm Length | Support Arm Mounting Angle | Binary Code | | | | |
|---|---|---|---|---|---|---|---|
| | | | 16 | 8 | 4 | 2 | 1 |
| 18 | 21" | +18.5° | 1 | 0 | 0 | 1 | 0 |
| 19 | 21" | −18.5° | 1 | 0 | 0 | 1 | 1 |
| 20 | 21" | +161.5° | 1 | 0 | 1 | 0 | 0 |
| 21 | 21" | −161.5° | 1 | 0 | 1 | 0 | 1 |
| 22 | 21" | +180° | 1 | 0 | 1 | 1 | 0 |

As an illustration, the end effector support arm 33 shown in FIG. 3 represents the 15.5" arm in the above table and the trigger elements 61 are arranged on the mounting plate 47 to generate the codes listed in the table for this arm. To aid in following the code, the appropriate trigger elements in FIG. 3 for each angular position of the arm have been joined by an extended line which is labeled with the associated angle. With the end effector support arm rotated to the indicated angle relative to the longitudinal axis of the arm 23, the appropriately labeled extended line in FIG. 3 will coincide with a line joining the sensor elements in FIG. 2 and it can be seen that the trigger elements on that extended line will be aligned with and therefore trigger the sensor elements which will generate the selected pattern of signals set forth in Table 1.

Figure 5:
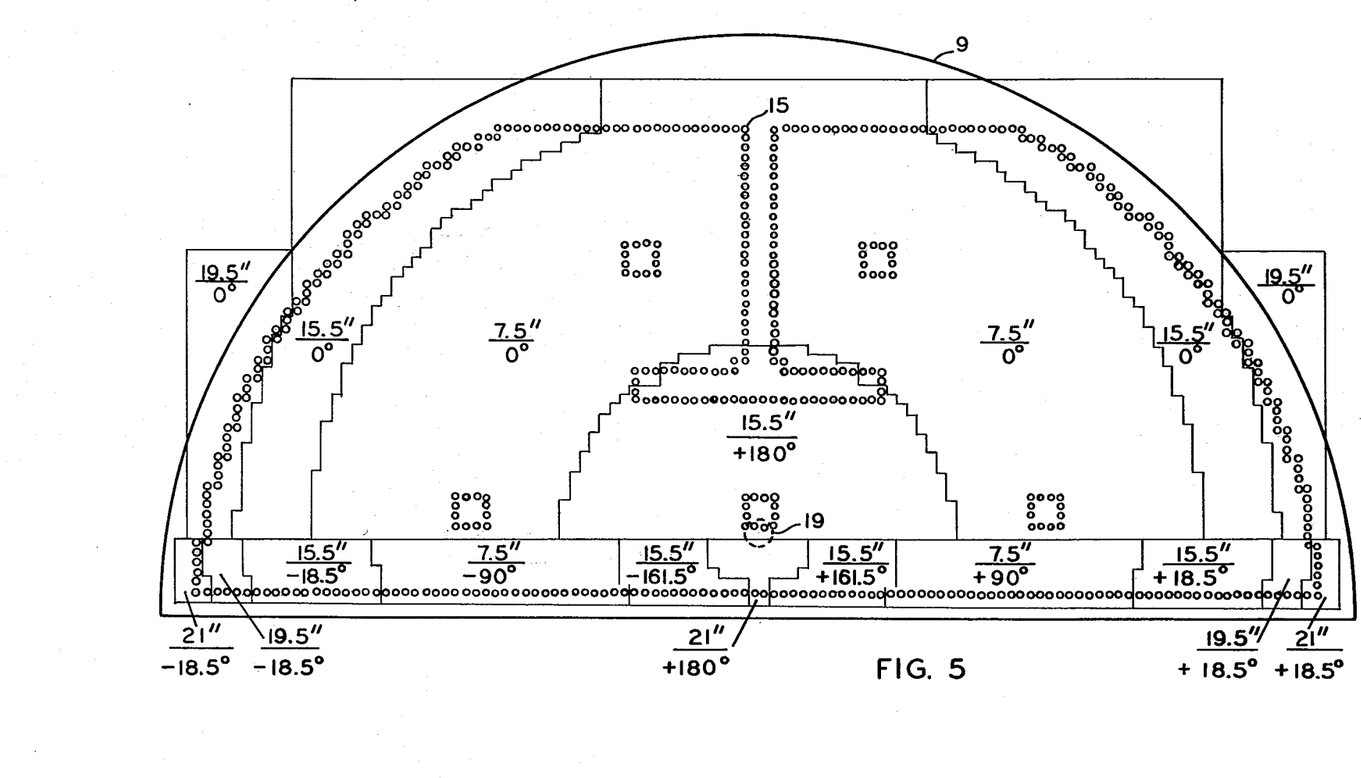
FIG. 5 is a plan view of a typical steam generator tubesheet illustrating the hole array and superimposed thereon is an exemplary pattern of cantilevered support arm lengths and angular positions suitable for servicing the holes in various portions of the hole array with a particular end effector.

While various end effectors are mounted on the end of the support arm in servicing the tubesheet, such as a drill and spot-face tool, brushes, a tube expander, a tube guide extractor, a welding tool and a TV monitor, all as discussed in the previously cited patent applications, the end effector support arms of Table I are all various length support arms carrying a drill and spot-face tool. Such is the case because several support arms of varying lengths each mountable at several angular positions on the platform 29, are required to drill out and spot-face all of the holes in a typical tubesheet. To illustrate this point, FIG. 5 is a plan view of one-half of a typical tubesheet 9 in which there are several thousand holes 15 arranged in basically a semicircular array having 114 horizontally spaced columns and 49 vertically spaced rows. Only the peripheral holes are shown in FIG. 5 for the purpose of clarity. The length of the drill support arm and the angle it must be set at to reach each hole in the tubesheet is indicated by the markings on the figure.

Figure 6:
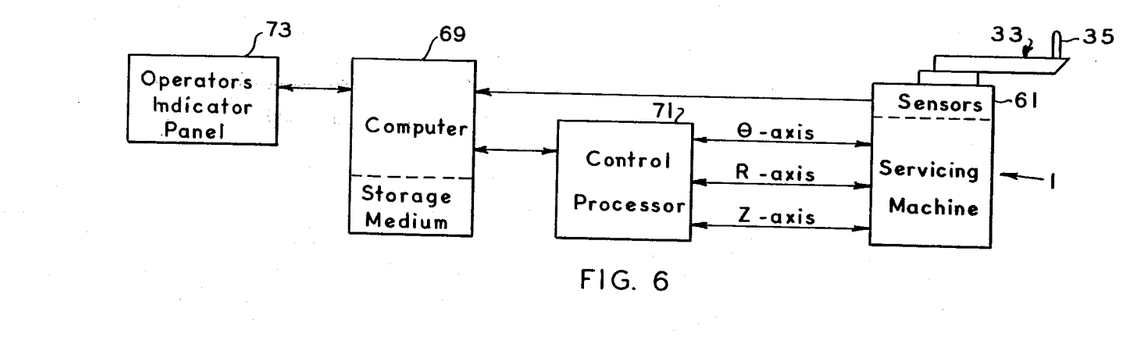
FIG. 6 is a schematic diagram of a control system incorporating the invention.

The system for controlling the servicing machine 1 is illustrated in block diagram form in FIG. 6. A full explanation of the control system is disclosed in the above mentioned copending application Ser. No. 952,431 filed Oct. 18, 1978. As described therein, the computer 69 sends command signals to the control processor 71 which in turn controls the servicing machine 1 by adjusting the angular position of the arm 23 (the θ axis), the longitudinal position of the carriage 27 along the arm 23 (the R axis) and the height of the platform 29 above the carriage 27 (the Z axis).

In generating the command signals for the positioning of the servicing machine, the computer reads the pattern of signals generated by the sensors 61 to identify the particular end effector support arm 33 and its angular position as mounted on the servicing machine. This information is used by the computer 69 to determine that the correct tool 35 for the operation to be performed has been installed and to establish the offset of the tool which must be taken into account when positioning the machine along the R, θ and Z axes. Information required by the computer in making these determinations and calculations is stored in a storage medium associated with the computer. The identification of the end effector and its angular position on the carriage is transmitted by the computer to the operator's indicator panel 73 for display.

Figure 7:
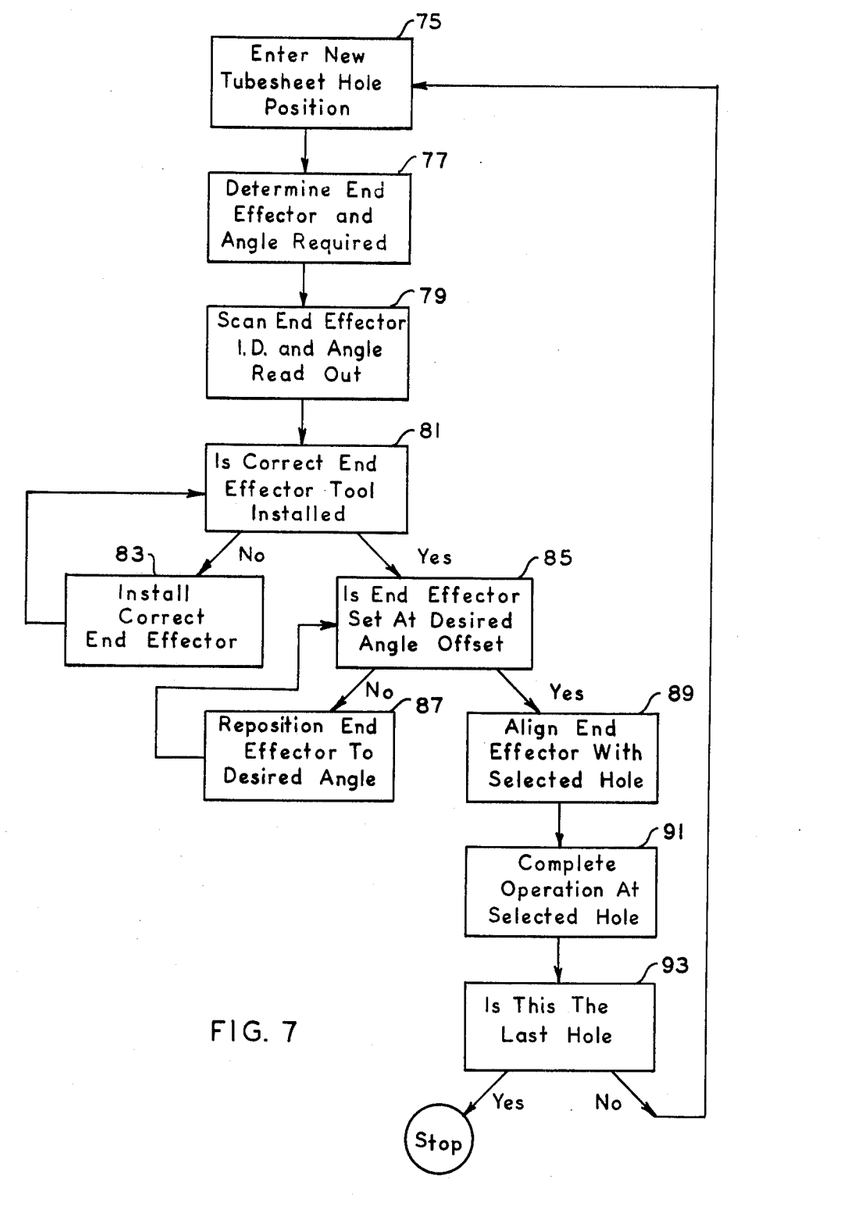
FIG. 7 is a flow chart schematically illustrating steps performed in carrying out the invention.

FIG. 7 is a flow diagram illustrating schematically steps performed by the servicing machine and its control system in carrying out the subject invention. For each hole at which a selected operation is to be performed as indicated in block 75 of FIG. 7, a determination is made in block 77 of the end effector required and the angle that it must be mounted on the platform 29. Such information can be stored in a look-up table stored in the storage medium associated with the computer. A scan is then made in block 79 of the pattern of signals generated by the sensors 61 to determine the actual identity of the end effector support arm 33 and the angle that it is mounted on the machine. This actual identity of the end effector support arm is then compared in block 81 with the required end effector support arm as determined in block 77 and if the correct end effector is not installed, the end effector is replaced in the manner discussed above as indicated in block 83 and the test is again made. When the correct tool is installed, a determination is then made in block 85 whether the actual angular position or offset of the end effector is correct by comparing it with the required angular offset, as also determined in block 77. If the angle is not correct, an adjustment is made as in block 87, again in the manner discussed above.

Once it is determined that the proper end effector is mounted at the correct angle, the arm 23, carriage 27 and elevator 29 are positioned in the manner discussed above to align the end effector with the selected hole as indicated in block 89, taking into account the offset. The selected operation such as drilling, etc., is then performed as at block 91 and, if this was the last hole at which the selected operation was to be performed, as determined in block 93, the procedure is complete. If not, another hole is selected and the procedure is repeated until all the appropriate holes have been so serviced.

The invention may be used with the automatic slewing end effector support table described in U.S. Pat. No. 4,200,424 and in copending application Ser. No. 974,159 filed Dec. 28, 1978 as well as the manually adjustable support arms described above. If the feedback sensor provided on the auto slew table is used to provide the indication of the angular position of the support arm, then the present invention need only be used to determine the identity of the end effector and, of course, fewer sensor and trigger elements would be required. It is to be understood, however, that the present invention could also be used to determine the angular position of the auto slew table.

While the invention is disclosed in what is conceived to be a practical and effective embodiment, it is recognized that departures can be made therefrom which are fully within the spirit of the invention. Accordingly, the invention is not to be limited to the details specifically disclosed but is to be accorded the full scope of the appended claims, including any and all equivalents thereof.

We claim:

1. Apparatus for servicing a steam generator tubesheet in which an end effector is mounted on the free end of a support member cantilevered, at selected angular positions in a plane parallel to the tubesheet, from a platform member of a carriage movable along an arm which rotates in a plane which is also parallel to the tubesheet, the improvement comprising:

signal generating means comprising at least two sensor elements mounted on one of said members, each of said sensor elements being operative to generate an electrical signal when triggered, and at least two trigger elements mounted on the other member, each of said trigger elements being operative to trigger a sensor element when aligned therewith, said sensor elements and trigger elements being arranged on the respective members to generate, through the alignment of trigger elements with selected ones of said sensor elements, a discrete pattern of electrical signals for each of a plurality of angular positions of the cantilevered support member on the platform member, and means responsive to said pattern of electrical signals to position said arm and carriage relative to said tubesheet to align the end effector with a selected location on the tubesheet.

2. The apparatus of claim 1 including a plurality of cantilevered end effector support members which may be rotatably mounted on said platform member one at a time and wherein the pattern of electrical signals generated by the sensor and trigger elements identifies the particular end effector support member mounted on the platform member as well as its angular position relative thereto.

3. Apparatus for servicing a steam generator tubesheet in which a plurality of end effector support members can be cantilevered one at a time from a platform member of a carriage movable along an arm which rotates in a plane parallel to the tubesheet, the improvement comprising:

signal generating means including at least two sensor elements mounted on one of said members, each of said sensor elements being operative to generate an electrical signal when triggered and at least one trigger element mounted on the other member, each of said trigger elements being operative to trigger a sensor element when aligned therewith, said sensor and trigger elements being arranged on the respective members to generate through the alignment of trigger elements with selected sensor elements a discrete pattern of electrical signals for each of said cantilevered end effector support members, and means responsive to the pattern of electrical signals to position said arm and carriage relative to said tubesheet to align an end effector carried on the free end of each cantilevered support member with a selected location on the tubesheet.

4. The apparatus of claim 2 or 3 wherein said platform and cantilevered support members have confronting parallel surfaces perpendicular to said pivot axis and wherein said sensor and trigger elements are embedded in said confronting surfaces.

5. The apparatus of claim 1, 2 or 3 including a pivot axis about which said cantilevered support member is rotatable with respect to said platform member, each of said sensor elements being located at a different radial distance from said pivot axis and at least one of said trigger elements being located at the same radial distance from said pivot axis as each of said sensor elements.

6. A method of servicing a steam generator tubesheet with an end effector mounted on a free end of an end effector support member which can be cantilevered at selected angles from a platform of a carriage movable along an arm which rotates in a plane parallel to the tubesheet:

generating a discrete pattern of electrical signals representative of a selected angle said end effector support member makes with said platform member;

determining an offset of the end effector relative to said platform in response to said pattern of electrical signals; and positioning the arm and carriage relative to the tubesheet with an adjustment for said determined offset to align the end effector with a selected location on the tubesheet.

7. The method of claim 6 wherein a plurality of different cantilevered end effector support members may be mounted on said platform member and wherein said signal generating step comprises generating a discrete pattern of electrical signals representative of the particular cantilevered end effector support member mounted on the platform member as well as its angular position relative thereto.

8. The method of claim 7 including prior to positioning the carriage and arm, the steps of comparing the angular position of the cantilevered support member represented by said discrete pattern of electrical signals with an angular position preselected for servicing the selected tubesheet location with the cantilevered end effector support member identified by said pattern of electrical signals and adjusting the angle of the cantilevered end effector support member to said preselected angle if they are not the same.

* * * * *